Aug. 2, 1966 F. L. HEADD ETAL 3,264,407

FACSIMILE SCANNING APPARATUS

Filed June 24, 1963 6 Sheets-Sheet 1

INVENTORS
FRANKLIN L. HEADD
JOHN R. MILES

BY

ATTORNEY

INVENTORS
FRANKLIN L. HEADD
JOHN R. MILES
BY
ATTORNEY

Aug. 2, 1966 F. L. HEADD ETAL 3,264,407

FACSIMILE SCANNING APPARATUS

Filed June 24, 1963 6 Sheets-Sheet 3

INVENTORS
FRANKLIN L. HEADD
JOHN R. MILES

BY [signature]

ATTORNEY

INVENTORS
FRANKLIN L. HEADD
JOHN R. MILES
BY
ATTORNEY

INVENTORS
FRANKLIN L. HEADD
JOHN R. MILES

BY [signature]
ATTORNEY

INVENTORS
FRANKLIN L. HEADD
JOHN R. MILES
BY [signature]
ATTORNEY

United States Patent Office 3,264,407 Patented August 2, 1966

3,264,407

FACSIMILE SCANNING APPARATUS

Franklin L. Headd, Penfield, N.Y., and John R. Miles, Glenview, Ill., assignors to Xerox Corporation, Rochester, N.Y., a corporation of New York Filed June 24, 1963, Ser. No. 290,260
4 Claims. (Cl. 178—7.1)

This invention relates to document scanning apparatus of the type wherein a moving document is scanned by a light source and reflected light from the document surface is translated into electrical signals and transported to a remote location for subsequent use in producing a facsimile of the original document.

The invention is disclosed herein in a particular embodiment of a facsimile scanning device for accumulating reflected light from the surface of a document and conveying the accumulated light to a photoelectric cell or a photomultiplier tube. In optical scanning apparatus, of the type disclosed, a light spot is moved across the surface of a document and a photoelectric cell is used to produce electrical signals in response to the light reflected from the document surface. It is advantageous to have as much of the light reflected from the document surface reach the photomultiplier as possible. Normally, even in the non-image or light colored areas, some of the light from the scanning source is absorbed by the document, some of the light passes through the document and some of the light is reflected and dispersed by the document. The reflected light does not maintain the configuration of the original spot, but disperses in a conical configuration away from the document. The photomultiplier intercepts only a portion of the reflected light cone. The reflected light, therefore, is of a lesser intensity than the original spot and the amount of the light reaching the photomultiplier is considerably less than the total light striking the document. For these reasons, it is necessary that the photomultiplier be extremely sensitive or the original light spot be of a very high intensity. For purposes of economy in the selection of a photomultiplier and a scanning light source, it is desirable that as much as possible light striking the document be utilized to actuate the photomultiplier.

It is, therefore, the primary object of this invention to accumulate light reflected from a document surface.

It is a further object of this invention to improve document scanning apparatus to reduce the amount of light loss in the scanning of a document.

It is a further object of this invention to accumulate and intensify reflected light from a document being scanned in a facsimile scanning apparatus.

It is a further object of this invention to improve light conveying apparatus used in optical scanning devices to facilitate the transmission of reflected light from an original document to a photomultiplier.

It is also an object of this invention to reinforce reflected light from a document being scanned in a facsimile scanning unit with stray light dispersed from the document surface and reflected light that has passed through the document.

These and other objects of this invention are attained by means of a reflective platen mounted in the conveyor system of a facsimile transmitter and over which a document to be reproduced must pass. A transparent platen is positioned above the reflective platen so that the document to be scanned passes between the transparent platen and the reflective platen. The transparent platen contains a slit of sufficient width to permit a spot of light to pass to the document surface without contacting the platen. The slit extends across the platen traversing the document to be reproduced. The slit and the reflective platen are contoured to accumulate stray light reflected from the surface of the document and to act as a light pipe for transmitting the accumulated light to a position where it may be conveyed to a photomultiplier. A light pipe is used either as the platen or in conjunction with the platen to gather light reflected from the document surface and to receive stray light accumulated by the platen for transmittal to a photomultiplier.

For a better understanding of the invention, as well as other objects and further features thereof, reference is had to the following detailed description of the invention to be read in connection with the accompanying drawings, wherein.

Figure 1:
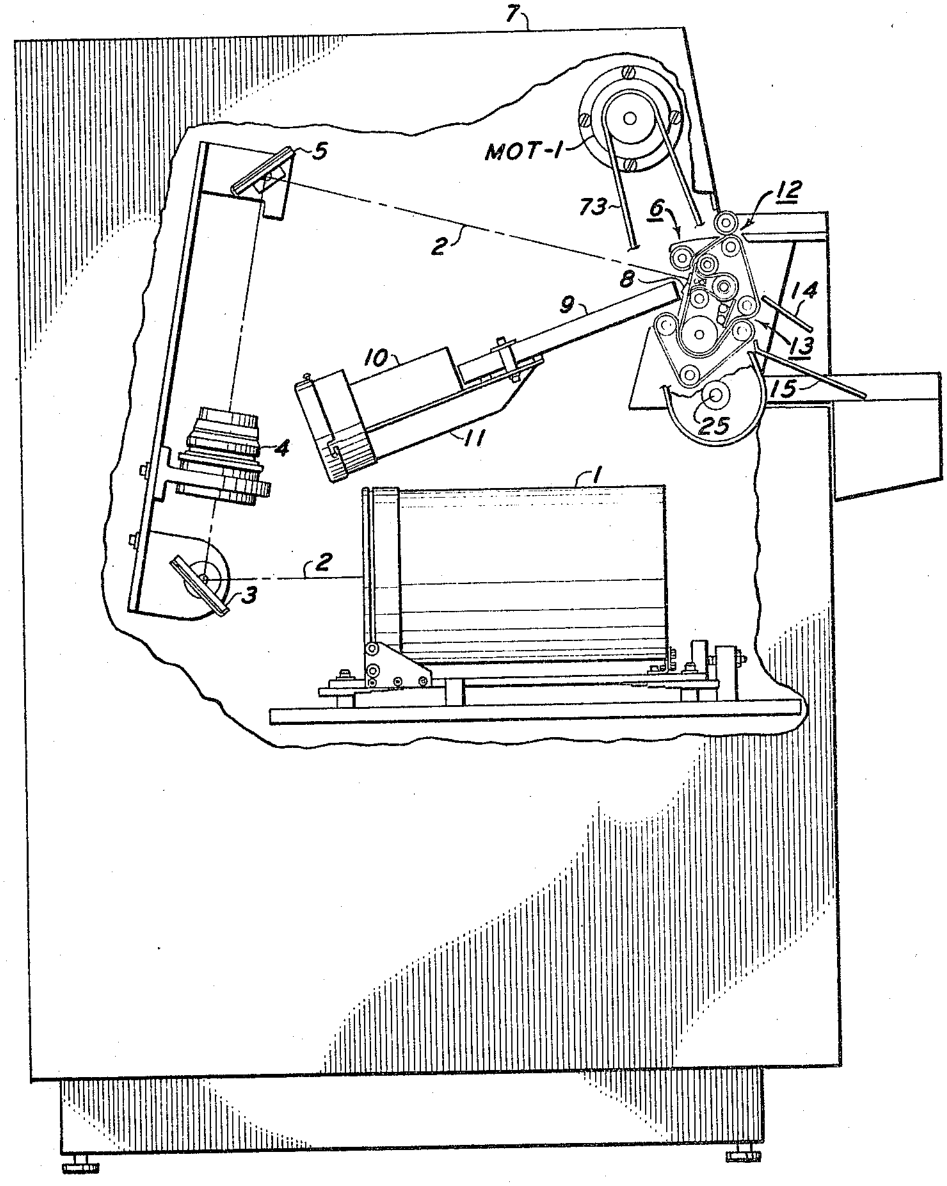
FIG. 1 is a side view of a facsimile scanning apparatus embodying the present invention.

FIG. 1 of the drawings shows an optical scanning system of a facsimile transmitter 7 containing one embodiment of the present invention. A cathode ray tube, mounted in a suitable support housing 1, emits a light spot along a path 2. The light spot moves back and forth in a straight line across the face of the tube and travels along path 2 to a mirror 3 where it is reflected into a lens 4. The lens 4 focuses the light spot to the size desired for subsequent document scanning purposes. The light spot then is reflected by a mirror 5 onto a document in document conveyor 6. The lens 4, the cathode ray tube housing 1 and the mirrors 3 and 5 are suitably mounted on support members attached to the frame of transmitter 7. It is desirable that the mirrors be adjustable to accurately position the light spot, and that the cathode ray tube be adjustable in a vertical direction to change the location of the horizontal scan line on the tube face. After a period of operation, the phosphor on the tube face wears out and it is desirable for purposes of spot brightness, to utilize new or unused phosphor on the tube face. The location of the spot or scan line on the tube face is moved upward or downward and the tube is physically adjusted in the opposite direction to maintain the same location on the light path 2.

A document placed into the conveyor system 6 at document feed station 12 is carried beneath an upper platen or paper guide 8 where it is scanned by the moving light spot. The document is carried past the scanning point by the conveyor and is discharged at document discharge station 13. The document leaving the conveyor system is deflected downward by deflector 14 into a paper tray 15 where it remains until such time as it is removed by an operator. Light from the scanning light spot is reflected from the document surface in the areas which do not contain graphic material and is accumulated by the upper platen 8 and a light pipe 9, and is conveyed by the light pipe to the photomultiplier 10 wherein it is translated into electrical signals. The photomultiplier 10 is mounted on a support bracket 11 attached to the transmitter frame.

Figure 2:
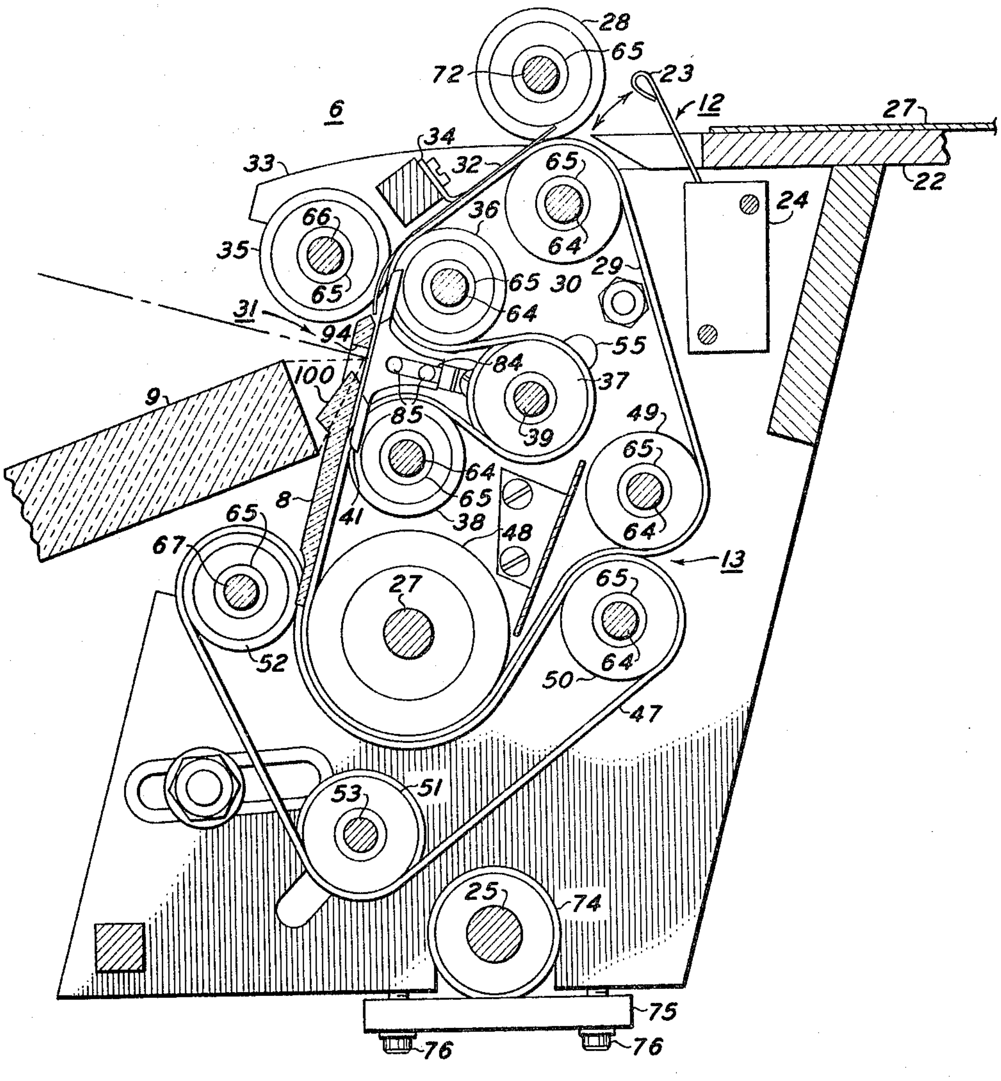
FIG. 2 is an enlarged side view of the conveyor and light accumulating system shown in FIG. 1.

The document conveyor 6, shown in sectional view in FIG. 2, is disclosed in the embodiment shown herein as a two-belt conveyor system with each belt composed of multiple individual strips of belting material. The document feed belt 29 follows a continuous path from document feed station 12 around feed roller 30, a platen roller 36, tensioning roller 37, platen roller 38, drive roll 48 and document discharge roller 49. The document discharge belt 47 works in conjunction with the feed belt 29 to carry a document from the platen 8 to document discharge station 13. The belt 47 is also a continuous belt and passes around roller 52, drive roll 48, discharge roller 50 and tensioning roller 51. Both belts are driven by drive roller 48 and are in contact with each other from the end of platen 8 around drive roller 48 to discharge station 13. A document emerging from beneath platen 8 on belt 29 is held between the two belts and carried to discharge station 13. The friction between drive roller 48 and belt 29 produces motion of belt 29 and the friction between belts 29 and 47 imparts motion to belt 47.

A pair of side plates 33 and 40 comprise a structural frame for the conveyor system 6. The belt rollers 30, 36, 38, 49 and 50 of the conveyor system are mounted on a series of shafts 64 which are secured at each end in the side frames 33 and 40. The rollers are constructed of a resilient material wrapped around bushings or bearings 65 which are mounted for rotation on the shafts 64. Rollers 36 and 38 contain segments with undercut diameters between individual belt strands, as more clearly seen in FIG. 8. Fingerlike extensions 92 of a platen 41 extend between and below the belts of the conveyor in the undercut portions of the rollers 36 and 38.

Figure 3:
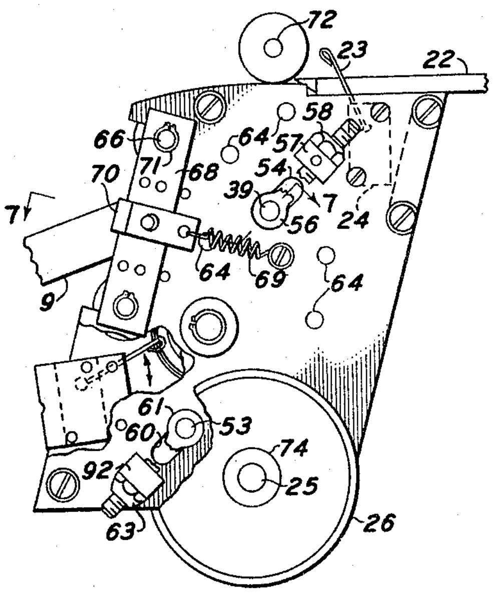
FIG. 3 is a left side view of the support plate for the conveyor rollers of the conveyor system shown in FIG. 2.
Figure 4:
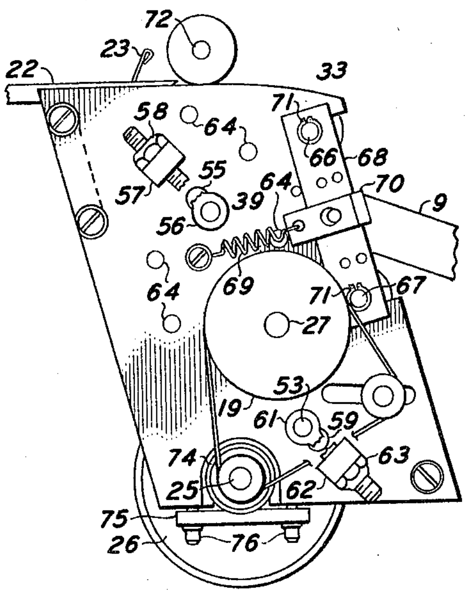
FIG. 4 is a right side view of the support plate for the conveyor rollers of the conveyor shown in FIG. 2.

A document feed roll 28 is mounted on shaft 72 at feed station 12, and functions in conjunction with the belt 29 as it passes around roller 30. As a document 21 is inserted at document feed station 12, the roller 28 and belt 29 move the document along the conveyor system beneath document guide 32. The roller 28 is freely rotatable on a shaft 72 mounted in the main frame of the transmitter. The roller 28 is also constructed of resilient material and mounted on a bearing 65 so that the roller turns independently of the shaft 72. A second document feed roll 35 is provided at the end of document guide 32 immediately preceding platen 41. The second feed roll 35 works in conjunction with the belt 29 to receive a document from beneath guide 32 and to direct the document onto the surface of the platen 41. The roller 35 is also constructed of resilient material mounted on a bearing 65 which rotates freely on a shaft 66. Shaft 66 and the shaft 67 of roller 52 are mounted in a pair of removable plates 68 seen in FIGS. 3 and 4. The function of removable plates 68 and the platens 8 and 41 is described below.

Document 21 is placed on a feeding table 22 and is moved forward into the conveyor system at feed station 12. The document 21 contacts an actuating arm 23 of a microswitch 24. Movement of the actuating arm 23 closes microswitch 24 initiating operation of motor MOT–1, which powers the conveyor system through a drive shaft 25 by means of pulley 26. Power is transmitted from drive shaft 25 to shaft 27 by means of belt 18 and pulley 19 to drive roller 48 and the belts of the conveyor system.

In operation, the document 21 is caught between feed roller 28 and belt 29 as the belt passes over roller 30. The document 21 is moved forward and is carried by belt 29 to the scanning station 31. Document guide 32 is mounted on side plate 33 by means of bracket 34, and is parallel to the belt 29 to guide the document between roller 35 and platen 41.

At this point, the belt 29 passes around roller 36 where its direction is changed downward around tensioning roller 37 and back up around roller 38 to a point where it is again used to actively convey the document. The tensioning roller 37 is mounted on a shaft 39 in side frame members 33 and 40.

After the document 21 has passed over the platen 41, it comes in contact with the belt 29 as the belt passes around roller 38. The document is held on the belt 29 by upper platen 8 and carried forward to a point where the discharge belt 47 comes in contact with the feed belt 29. The document is then carried between the two belts around the belt driving roll 48 and is ejected from the conveyor system at discharge station 13.

The tensioning roll 37 mounted on shaft 39 and the tensioning roll 51 mounted on shaft 43 are each adjustable to ensure proper tension on the belts 29 and 47, respectively. The tensioning roller shaft 39 is held in slots 54 and 55 of the side plates 40 and 33, respectively. The shaft 39 is positionable in the slots 54 and 55 by means of a pair of eyebolts 56 secured to each end of the shaft 39 and passing through lug members 57 secured to the side plates 33 and 40. A pair of nuts 58 are mounted on the eyebolts 56 and bear against lugs 57 so that loosening or tightening of the nuts 58 produces movement of shaft 39 in slots 54 and 55. The same type of structure is used to position shaft 53 in slots 59 and 60. That is, bolts 61 are secured to shaft 53 and pass through lugs 62. Nuts 63 rest on lugs 62 and position the eyebolts 61 and shaft 53 in slots 59 and 60.

The conveyor system 6 is driven by motor MOT–1 through belt 73 to pulley 26 which is secured to the end of drive shaft 25. The drive shaft 25 is journaled in the frame of transmitter 7 and passes through a pair of bearings 74 secured in the side frames 33 and 40, by means of brackets 75 and bolts 76. Under this arrangement, the conveyor system 6 is pivotable about drive shaft 25 by moving side frames 33 and 40 forward, rotating bearings 74 about drive shaft 25. Thus, the entire conveyor system may be pivoted forward toward the operator exposing the plates 8 and 41, permitting the operator to free any paper jams that may occur within the conveyor system.

Figure 7:
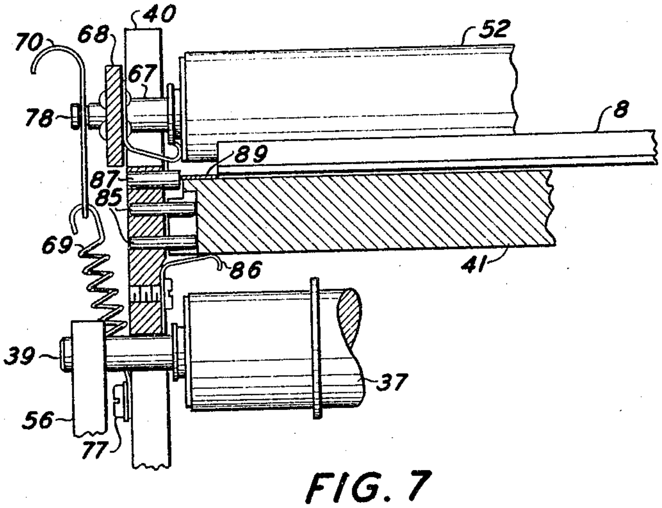
FIG. 7 is a sectional view taken along line 7—7 of FIG. 3.

With the conveyor swung forward about shaft 25, the removable plates 68 may be lifted away from the side plates 33 and 40 removing rollers 35 and 52 and freeing platen 8. As seen in FIG. 7, the removable plates 68 are held in position on side frames 33 and 40 by tension spring 69 secured to side plate 40 by screw 77 and clip 70. The clip 70 contains a hole to slide over a pin 78 secured to plate 68. The pin 78 has a notch or undercut portion which accommodates and retains clip 70. The bottom platen 41 contains a slot 84, as seen in FIG. 2, which slides over a pair of pins 85 in each of the side plates 40 and 33. The bottom platen 41 is forced upward toward the upper platen 8 by means of leaf spring 86 mounted on the side plates. The upper platen 8 contains notched areas in the outer edges which accommodate two pins 87 also secured in the side plates 40 and 33. The upper platen 8 is held down by a leaf spring 88 secured to the removable plate 68. The upper platen 8 and the bottom platen 41 are separated by a spacer 89 at each end of the platens. The spacers 89 are of sufficient thickness to permit the passage of a sheet of paper between the upper and the lower platen. The arrangement of parts shown in FIG. 7 for removing the plate 68 and platen 8 from side plate 40 is duplicated on the opposite side of the platen to remove the second plate 68 from the side plate 33.

The upper surface of the bottom platen 41 has a flat white finish so that when the document 21 is transparent or translucent, the light that passes through the document will be diffused and reflected back through the document and eventually be captured by the light pipe and the photomultiplier. Thus, the bottom platen 41 serves to accumulate light that would otherwise be lost and direct that light back toward the photomultiplier to reinforce the light reflected directly from the document surface.

Figure 8:
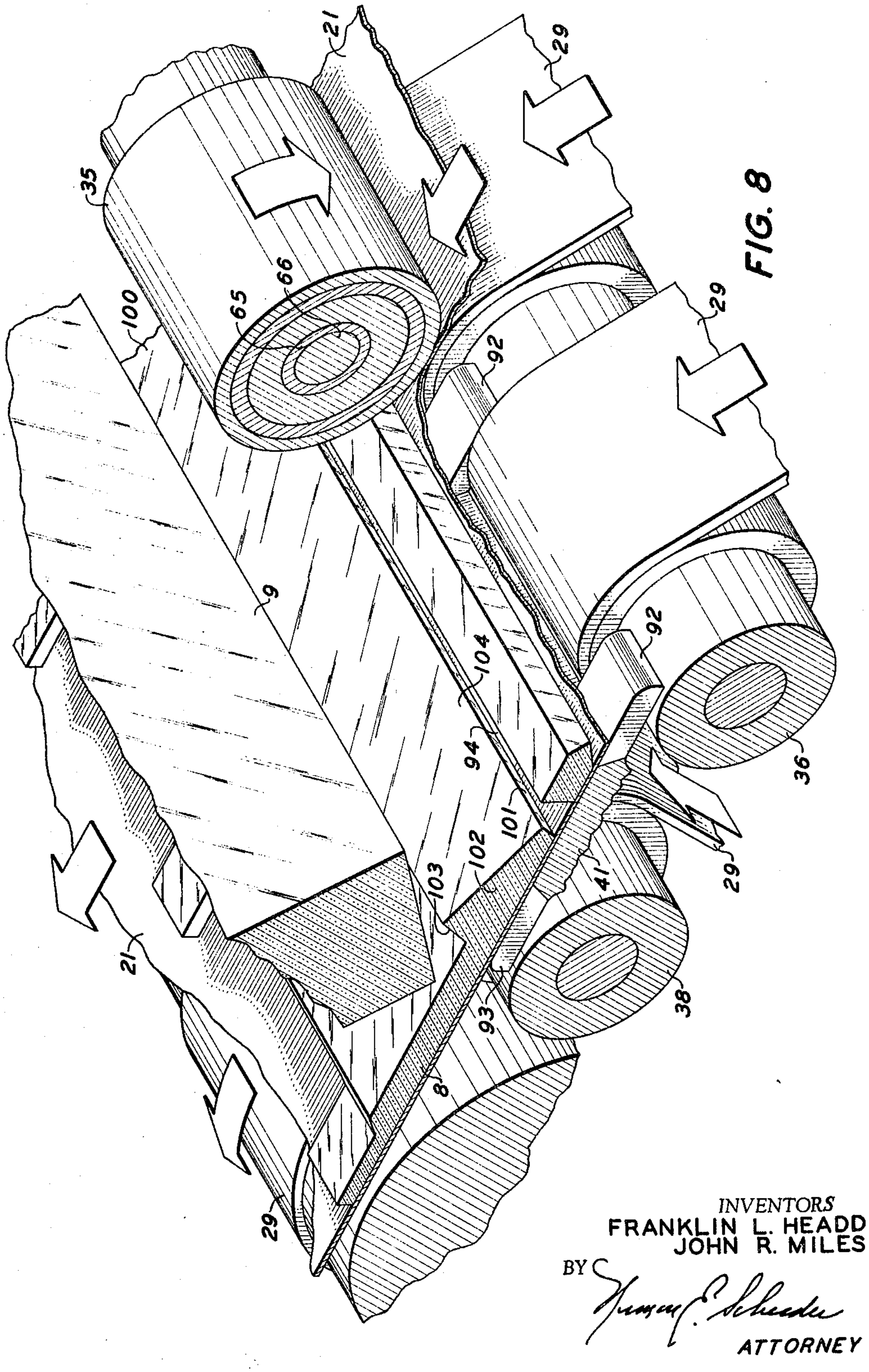
FIG. 8 is an isometric view of the light accumulating system.
Figures 9, 10, 11, 12:
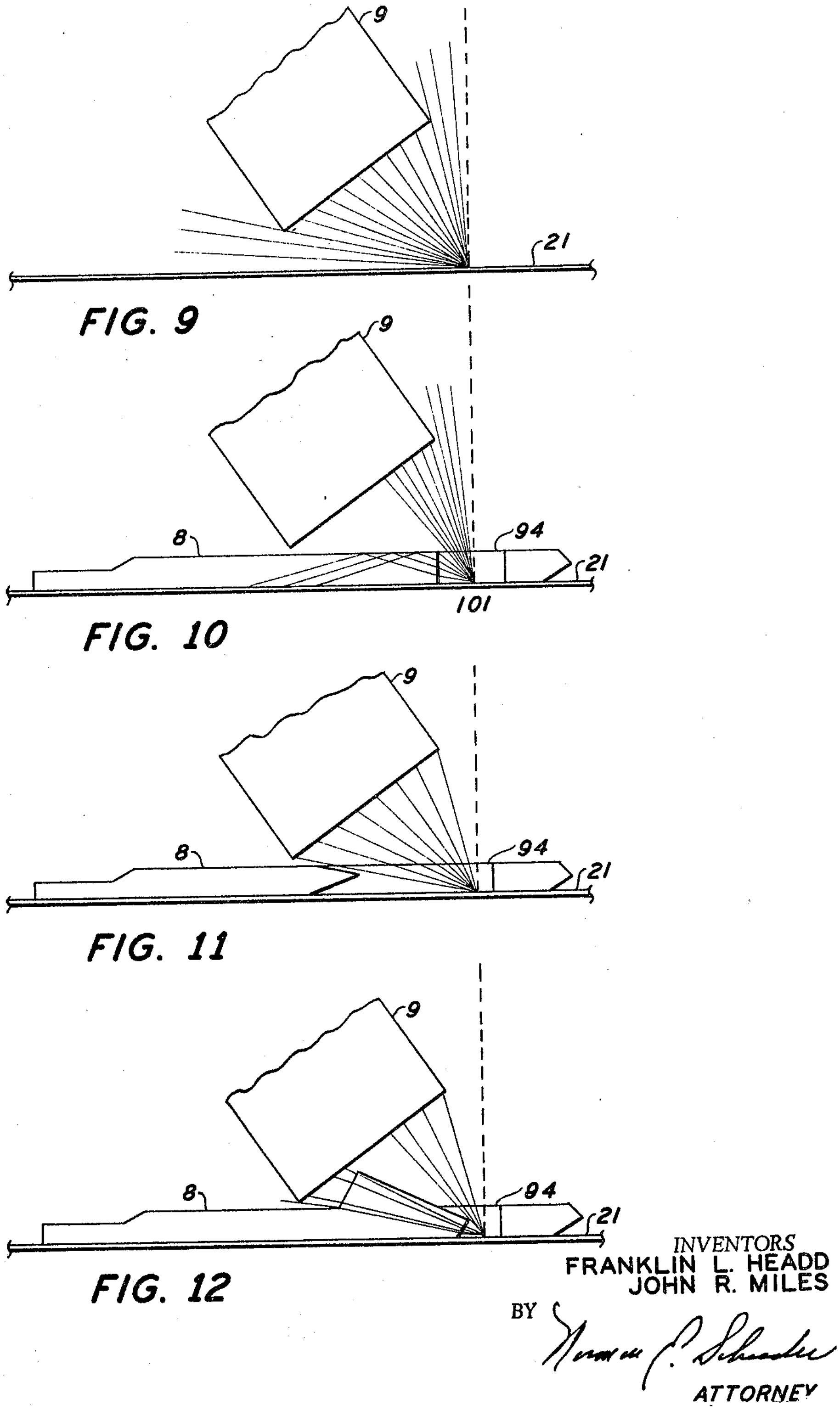
FIGS. 9 through 12 are schematic views of a light pipe in a light accumulating system; and, FIG. 13 is a schematic view illustrating another embodiment of a light pipe used in a light accumulating system.

One embodiment of the upper platen 8 and the light pipe 9 is shown in FIG. 8. The platen is constructed of a transparent material, such as Lucite, and serves the dual-purpose of holding the document in a flat position in the areas being scanned and of accumulating and transmitting reflected light from the document surface to the light pipe 9 and thus to the photomultiplier 10. A slit 94 extending substantially across the width of the platen 8 permits uninterrupted passage of the light spot from the cathode ray tube 1 to the surface of the document 21. As the light spot moves back and forth along the slit, it scans the document and reflects light from the non-image areas. The reflected light tends to disperse in a conical configuration away from the document. As illustrated in FIG. 9, if there were no platen present, a certain amount of the reflected light would enter the light pipe 9 and be carried to the photomultiplier 10. However, in this case, since the document is being pushed forward by belt 29 and roller 35, it would not lie in a flat position on the platen and the reflected light would be erratic. If a flat guide platen is used with a slit in it permitting passage of the light to the document surface, as shown in FIG. 10, a portion of the light is captured in the platen cutting off the amount of light reaching the light pipe 9. If the slit 94 is made of sufficient width to permit the passage of light to the full width of the light pipe 9 as illustrated in FIG. 11, then the opening in the platen is too large to hold the document in a flat position and buckling occurs dispersing the light in the same manner as when no platen is present. The platen illustrated in FIG. 12 contains a slit narrow enough to prevent buckling of the document and is shaped to capture light reflected from the document and to transport that light into the light pipe 9.

The configuration of the light pipe is important to the collection and transmission of light to the photomultiplier so that a maximum amount of light will be accumulated and the intensity of the reflected light will remain constant throughout the entire length of the scan. Disclosed herein are two embodiments of applicants' light pipe that are adaptable to provide varying degrees of intensity of light to the photomultiplier and are capable of varying the intensity of the light between the middle of the scan and the ends of the scan as required for a given set of conditions. The light pipes disclosed contain the normal, flat, parallel surfaces which reflect the light along its path through the light pipe. The light rays emitted from a point source on a document surface do not travel in parallel lines, but rather fan out in a conical configuration, thus, a large number of the light rays strike the side surfaces 95 of the light pipe. Control of these rays is important to controlling the intensity of the light reaching the photomultiplier and the uniformity of intensity throughout the entire scan.

Figure 5:
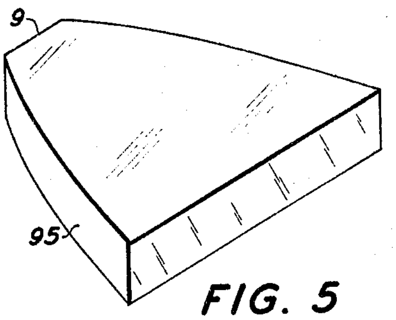
FIG. 5 is an isometric view of a parabolic light pipe suitable for use in the present invention.
Figure 6:
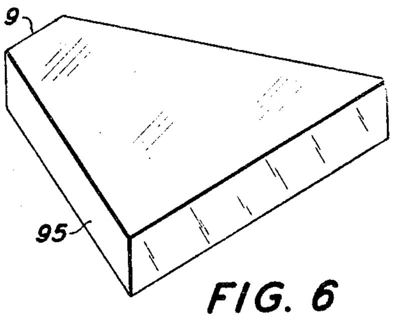
FIG. 6 is an isometric view of a trapezoidal light pipe suitable for use with the present invention.

The light pipe 9 may be parabolic or trapezoidal in shape, as shown in FIGS. 5 and 6, respectively. The large end of the light pipe is positioned in close proximity to the document surface to receive light rays reflected from the document surface. The small end is positioned at the lens of the photomultiplier tube to transmit light into the photomultiplier. As reflected light is picked up by the large end of the light pipe, it is transported through the light pipe to the small end where it leaves the light pipe and enters the photomultiplier tube. If the sides of the light pipe are clear and highly polished, all light that strikes the sides at an angle greater than the critical angle will be reflected internally ultimately reaching the small end of the light pipe.

It is possible to frost or roughen the side surfaces of the light pipe to decrease internal reflection from the sides 95 of the light pipe and thus control the amount of light that is permitted to pass through the sides of the light pipe. The amount of frosting or roughening may be varied to provide varying degrees of light intensity at the extreme ends of the scan.

The transparent upper platen 8 contains a small built-in light pipe 100 which is designed to accumulate reflected light rays that would normally be intercepted by the platen and carry those light rays upward into the light pipe 9. The light rays are intercepted by the surface 101 (FIG. 8) enter the platen 8, and exit through surface 103.

As illustrated in FIG. 10, if the platen were of flat configuration, as is normally used, many of the light rays would strike surface 101 at an angle greater than the critical angle, thereby being reflected away and making no contribution to the scanning process. Further, of those rays that do enter the platen through surface 101 (FIG. 10), additional rays would be lost because of total internal reflection within platen 8, again because of the critical angle of the platen material. Therefore, by constructing the small light pipe 100 as an integral part of the platen 8, the light rays strike surface 101 at less than the critical angle, and are allowed to enter the platen. Then, since surface 103 is constructed parallel to 101, the rays are allowed to leave the platen through surface 103 and enter the light pipe 9. Surface 104 of the small light pipe is angled such that a ray entering surface 101 and striking 104 internally will be reflected so as to strike surface 103 at such an angle as to allow the ray to leave the platen through surface 103.

Figure 13:
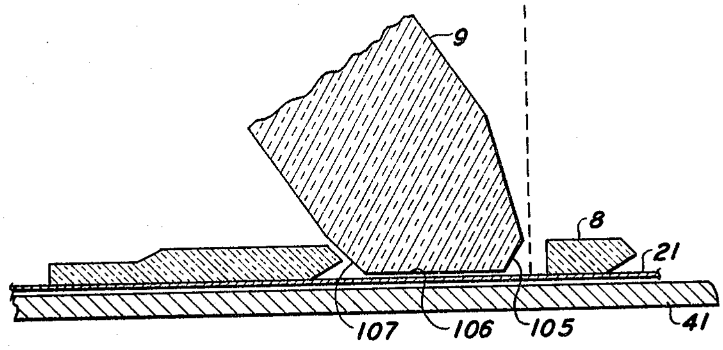

An alternative embodiment of applicants' light accumulating system is shown in FIG. 13. In this embodiment, the large end of the light pipe is shaped to serve as an upper platen and to accumulate a maximum amount of light reflected from the document surface without an intermediary light pipe. The end of the light pipe is extended downward toward the document surface and cut parallel to the lower platen 41 so that the light pipe serves as a paper guide for the document passing over the platen. The leading edge of the bottom surface of the light pipe is cut so that the light pipe does not interfere with the path of travel of the spot of light from the cathode ray tube to the document surface and presents a flat surface 105 to intercept light rays reflected from the document surface. Light rays entering the light pipe through surface 105 will strike the bottom surface of the light pipe at an angle greater than the critical angle and thus be reflected internally in the light pipe and transported to the photomultiplier.

The rear or trailing edge 107 of the bottom surface of the light pipe may also be cut at an angle to provide the amount of internal reflection desired. The light rays emitting close to the document surface strike at less than the critical angle for reflection off the back wall of the light pipe unless that surface is undercut to change the angle of incidence between the light rays and the wall and to provide reflection of those light rays up through the light pipe. The angle of surface 107 may be varied across the length of the light pipe to control the amount of reflected light at various points along the scan and thus control the uniformity of light throughout the scan. It is possible merely by changing the angle of this surface to increase the amount of reflected light at the ends of the scan where the light is normally at a minimum and to decrease the amount of reflected light in the center of the scan so that there is uniform intensity of light throughout the scan.

While the present invention, as to its objects and advantages, as described herein, has been carried out in specific embodiments thereof, it is not desired to be limited thereby but it is intended to cover the invention broadly within the spirit and scope of the appended claims.

What is claimed is:

1. A document scanning apparatus including a conveyor system for transporting a document through a path of movement passing a scanning station at a predetermined rate, a light source for scanning a document at the scanning station transversely to the path of movement of the document, a document support platen positioned at the scanning station on one side of the document path, said platen having a light reflective surface adjacent the document path, a document guide positioned on the opposite side of the document path from the support platen to hold the document on the support platen, the document guide being transparent and positioned to intercept light reflected from the document surface and from the platen surface, and shaped to convey the reflected light to a predetermined point for use in producing an electrical signal.

2. A document scanning apparatus including a conveyor system for transporting a document through a path of movement past a scanning station at a predetermined rate, a light source for scanning a document at the scanning station transversely to the path of movement of the document, a document support platen positioned at the scanning station on one side of the document path, said platen having a light reflective surface adjacent the document path, a document guide positioned on the opposite side of the document path from the support platen to hold the document on the support platen, said document guide containing a slot extending across the scanning station to permit uninterrupted passage of light from the light source to the document surface, one side of the slot being shaped to intercept light reflected from the document surface, the guide platen being transparent and shaped to convey the intercepted light to a predetermined point, and a light pipe adjacent to the document guide to intercept light rays emitted from the document guide for transmittal to a photomultiplier.

3. A light accumulating system for use in a document scanning apparatus of the type wherein a document is conveyed through a path of movement past a scanning station by a conveyor system including a light source for scanning successive incremental areas of a document transversely to the direction of movement of the document;

a transparent document guide positioned adjacent to the document path;

the document guide containing a first surface which traverses the document path adjacent to the incremental area being scanned on the document;

said first surface being sloped to intercept a portion of light reflected from the document surface;

and a light pipe traversing the document path at the scanning station to intercept light rays reflected from the document surface which are not intercepted by the document guide;

the document guide being shaped to convey intercepted light to a second surface adjacent the light pipe; said second surface being sloped to emit light rays from the document guide into the light pipe;

said light pipe being constructed to convey accumulated light from the document surface and the document guide to a predetermined point for conversion into electrical signals.

4. A light accumulating system for use in a document scanning apparatus of the type wherein a document is conveyed through a path of movement past a scanning station by a conveyor system including a light source for scanning successive incremental areas of a document transversely to the direction of movement of the document;

a document support platen positioned on one side of the document path and containing a light reflective surface adjacent to the document path;

a transparent document guide positioned on the opposite side of the document path from the support platen;

the document guide containing a first surface which traverses the document path adjacent to the incremental area being scanned on the document;

said first surface being sloped to intercept a portion of light reflected from the document surface and from the support platen surface;

and a light pipe traversing the document path at the scanning station to intercept light rays reflected from the document surface and from the surface of the support platen which are not intercepted by the document guide;

the document guide being shaped to convey intercepted light to a second surface adjacent the light pipe; said second surface being sloped to emit light rays from the document guide into the light pipe;

said light pipe being constructed to convey accumulated light from the document surface and from the document guide to a predetermined point for conversion into electrical signals.

References Cited by the Examiner

UNITED STATES PATENTS

| | | | |
|---|---|---|---|
| 1,751,584 | 3/1930 | Hansell | 178—6 |
| 2,855,539 | 10/1958 | Hoover | 178—6 |

DAVID G. REDINBAUGH, *Primary Examiner.*

J. McHUGH, *Assistant Examiner.*